Feb. 12, 1935. C. A. SWANSTROM 1,990,718
PROCESS OF MAKING NUTS
Filed April 23, 1931
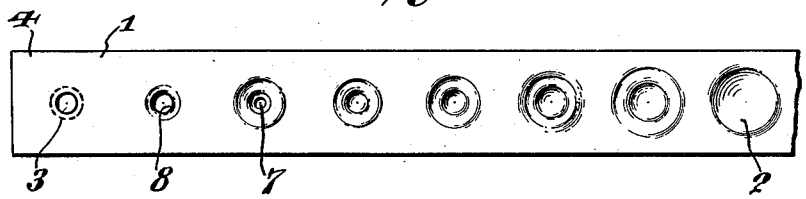
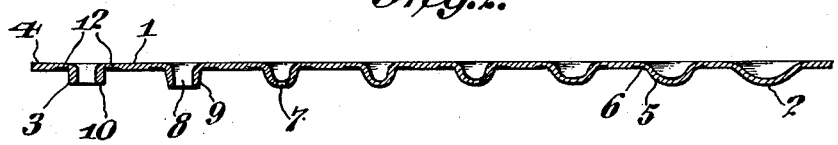
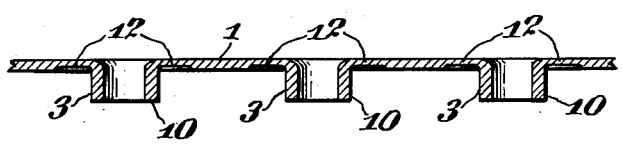
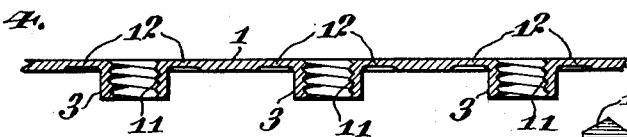
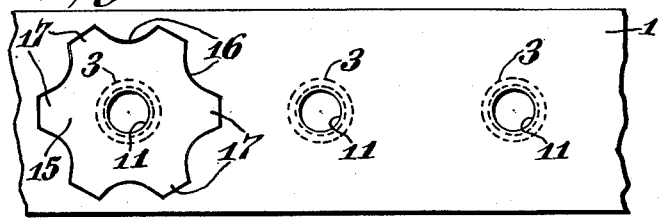
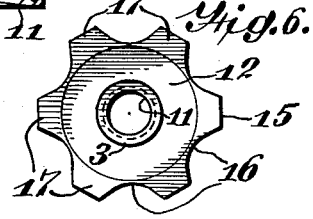
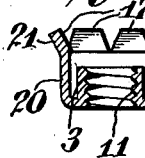 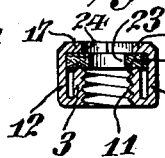 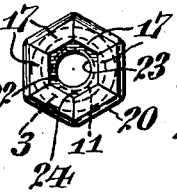
INVENTOR
Carl Arthur Swanstrom
By Cyrus N. Anderson
Attorney Patented Feb. 12, 1935

1,990,718

UNITED STATES PATENT OFFICE 1,990,718

PROCESS OF MAKING NUTS

Carl Arthur Swanstrom, Newark, N. J., assignor to Elastic Stop Nut Corporation, a corporation of New Jersey Application April 23, 1931, Serial No. 532,141

9 Claims. (Cl. 10—86)

My invention relates to the process of making nuts of the general character or type of that shown in Letters Patent of the United States No. 1,550,282, dated August 18, 1925, and to nuts produced by the said process.

The general object of the invention is to provide a process consisting of a novel procedure by the employment of which the cost of manufacture may be materially decreased.

It also is an object of the invention to provide a novel process by the employment of which nuts may be produced from sheet metal stock rapidly and economically.

Without setting forth generally the further objects of the invention I shall now proceed with a detailed description thereof wherein other objects and advantages will be referred to specifically or else will become apparent.

In the description of the invention and in order that the same may be readily understood and the novel features thereof rendered more apparent I shall refer to the drawing accompanying this specification and forming a part hereof wherein:

Fig. 1 is a plan view of one end portion of a strip of thin sheet metal upon which certain operations as indicated have been performed;

Fig. 2 is a central section taken lengthwise of the strip shown in Fig. 1;

Fig. 3 is a view in central section of a portion of a strip having tubular upset portions formed therein at intervals;

Fig. 4 is a view similar to that shown in Fig. 3 but with the tubular upset portions tapped as shown;

Fig. 5 is a view in plan of the section of strip shown in Fig. 4 and indicating that portions thereof including the upset tubular portions are to be blanked out;

Fig. 6 is a view of a blank nut from the strips shown in Figs. 4 and 5, the said view showing the opposite side of the blank from that which is depicted in Fig. 5;

Fig. 7 is a transverse sectional view of the blank shown in Fig. 6;

Fig. 8 is a vertical sectional view of a nut blank formed by turning the outer portions of the blank shown in Fig. 6 upwardly in concentric relation to the tubular tapped portion thereof;

Fig. 9 is a longitudinal sectional view of a nut formed from the blank shown in Fig. 8; and Fig. 10 is a top plan view of the nut shown in Fig. 9.

In the carrying out or practicing of the art or process embodying my invention I take a narrow strip of metal such as, for example, steel which may be of any length desired and pass the same through a machine press provided with a series of forming tools capable of forming hollow projections such as are shown in Figs. 1 and 2. Machines of this character are well known in the art and in consequence I have not illustrated herein the machine employed by me.

It will be assumed that the strip 1 in traveling through the machine moves from the right toward the left. In passing through the machine the metal is pressed or projected outwardly upon one side of the strip and such pressed-out metal is acted upon successively so that it is changed from the shape shown at 2 to that shown at 3. Assuming that the end 4 of the strip is the front end, there will be formed in adjoining relation to such end a depression and projection such as is shown at the right-hand end of the strip shown in Figs. 1 and 2. After the formation of such projection and depression the strip will be fed forward through the machine the distance of a step, whereupon the next succeeding pressing tool of the press will act upon the projection at 2 to slightly thicken the metal of the projection as indicated at 5 and also will cause a thinning of the metal as indicated at 6 surrounding the projection 5. The projection also will be reduced slightly in height as will be apparent from an inspection of Fig. 2 of the drawing. There will be formed simultaneously another succeeding projection such as that indicated at 2 in Figs. 1 and 2. The operations upon each of the projections follow successively as will be clearly apparent from Figs. 1 and 2, with the shapes of the projections 2 and 5 being changed as a result of each operation. At the sixth operation the projection will have a hole 7 formed through the bottom thereof. At the next or the seventh operation the hole will be enlarged as indicated at 8 with a consequent thinning of the metal at the edge of the tubular projection 9. The said tubular projection also will be somewhat lengthened. During the next or the eighth operation the edge of the tubular projection 9 will be subjected to pressure and thickened and smoothed as indicated at 10 in Fig. 2 of the drawing. When the various projections of the strip have been converted or changed into tubular projections, such as shown at 3, then the strip is removed and the said projections are tapped or threaded as shown at 11. It will be noted that the walls of the tubular projection at 3 have been thickened so that they are somewhat thicker than the original strip and also that a circular portion or zone of the metal contiguous to and surrounding the base of the said projection is of less thickness, as shown at 12, than the normal or original thickness of the strip employed in the manufacture of a nut. The tubular projections 3 having been tapped, the nut blanks are cut from the strip as indicated at 15, one of the said blanks separate from the strip being shown in Fig. 6. The blanks 15 as they are cut from the strip are provided with notches 16 the bottoms of which are of arcuate shape as shown. These notches are separated by projections 17. A blank having thus been formed, the portion thereof surrounding the base of the tubular projection 3 is bent upwardly and preferably into concentric relation to the said tubular projection 3, forming a wall or skirt 20. As shown in Figs. 8, 9 and 10, the wall 20 is shaped to form a hexagonal nut, although it will be understood that this wall may be of any other desirable shape in cross section, such as square or circular. The relatively thin portion 12 is of a width such that when bent upwardly around the tubular projection 3 the upper edge thereof, which is the outer edge of the portion 12, occupies a plane a short distance above the top of the tubular projection 3. Preferably the projections 17, previously referred to, are inclined outwardly as shown at 21 in Fig. 8 to facilitate the insertion of a washer, preferably in the form of an annular disc 22 of suitable elastic material, such as rubber, into position within the skirt 20 in which position it rests upon the upper end of the tubular projection 3 as shown in Fig. 9. The disc 22 having been placed in position, the projections 17 are bent inwardly onto the outer portion of the top side of the said disc to firmly and permanently secure the same in place. The inclination of the edges of the notches 16 and the tapering of the projections 17 are such that when the latter are turned inwardly as shown in Figs. 9 and 10 in drawing the edges thereof are in contiguous relation to each other so as to provide a neat and in effect a solid top for the nut. Preferably the skirt 20 which constitutes the side or sides of the nut is spaced from the exterior side of the projection 3. The external diameter of the washer 22 is preferably equal to that of the internal diameter of the skirt 20 which constitutes the side or sides of the nut, while the inner diameter of the said washer, that is the diameter of the opening 23 therethrough, is less than the internal diameter of the tubular projection 3. The opening 24 provided by the inner edges of the inwardly turned projections 17 is greater than the opening 23 through the disc 22. The arrangement as shown leaves the inner edge of the washer 22 free to be engaged by the screw-threaded portion of the bolt or screw with which the nut may be engaged.

The bending upwardly of the skirt 20 as shown in Figs. 8 and 9 is facilitated or rendered more easy by the presence of the less thick annular portion 12, provided as previously mentioned, and likewise the bending inwardly of the projections 17 into the positions shown in Figs. 9 and 10 is facilitated and rendered more easy.

It will be seen that by the employment of the process of my invention I am enabled to effect rapidly and economically the thickening of the metal of the tubular projection 3 as compared with the thickness of the metal sheet 1; and that to obtain such additional thickness the metal is pressed from a portion of the sheet immediately surrounding the said tubular projection into the latter, but notwithstanding the reduced thickness of the metal of the side or sides of the nut the nut is strong, rigid and durable. Also, by the employment of the process of my invention I am enabled to produce nuts of requisite strength and rigidity by using a smaller amount of metal than would be required if the nut consisted of a solid metal piece.

Although in the description of my invention I have disclosed a process wherein eight operations are employed to effect the formation of the tubular projection 3, yet I desire it to be understood that the number of these operations may be either increased or decreased within reasonable limits without departing from the invention.

Having thus described my invention what I claim and desire to secure by Letters Patent is:

1. The process of forming a nut from sheet metal which comprises the formation by pressure of a tubular projection upon one side of said sheet, subjecting said tubular projection to pressure to increase the thickness of the wall thereof, tapping the said tubular projection, cutting a blank from said sheet the said blank including the said tubular projection, bending the portion of said blank surrounding said tubular projection upwardly into approximately concentric relation with respect to said projection, and thereafter bending the outer edge of said upwardly bent portion inwardly into overlying relation with respect to the said tubular projection.

2. The process of producing nuts from sheet metal which comprises the formation of a projection upon one side of said sheet, simultaneously with the formation of said projection causing surrounding portions of the metal of the said sheet to flow into the sides of the said projection, forming an opening through the bottom of said projection and changing the same by pressure to tubular form, tapping the said projection, cutting a blank from the said sheet including the said projection at the central portion of said blank, providing notches at intervals in the edge of said blank to form intervening projecting portions, bending the portions of said blank surrounding the base of said projection upwardly with respect to the latter into concentric relation therewith, and thereafter bending the said projecting portions inwardly into overlying relation to the said tubular projection.

3. The process of producing a nut from sheet metal which comprises the formation by pressure of a projection upon one side of the said sheet, subjecting the said projection to successive operations to cause a flow of portions of the metal surrounding said projection into the side walls of said projection, forming an opening through the bottom of said projection and subjecting the same to pressure to change the same into tubular form, thereafter tapping the same, cutting a blank from the said sheet including the said tubular projection, simultaneously with the cutting of said blank forming notches at intervals in the edge of said blank, the said blank being of a diameter substantially greater than the diameter of the said tubular projection, bending the portions of said blank surrounding said tubular projection upwardly into approximately concentric relation to the said tubular projection, the edge of said upwardly bent portion extending above the top of the said tubular projection, inserting a disc into the said upwardly bent portion onto the top of the said tubular projection, and thereafter bending the projections between said notches inwardly onto the top side of the said disc.

4. The process of producing nuts which comprises the forming of projections at intervals and successively in a sheet metal strip, the said projections being formed by a number of successive pressure operations, causing portions of the metal of said strip surrounding the said projections to flow into the latter simultaneously with the formation thereof to effect a thickening of the same and to simultaneously reduce the thickness of the metal contiguous to and in surrounding relation to the said projections, forming openings successively through the bottoms of said projections, converting the said projections after the formation of openings therethrough successively into tubular projections, successively upsetting and thickening the outer ends of said projections, tapping the said projections, cutting blanks from the said strip, each of the said blanks including a tapped tubular projection, the relatively thin portion of metal surrounding the same and portions of metal surrounding the said relatively thin portion, bending the portions of metal surrounding the said tubular projections upwardly into approximately concentric relation to the said tubular projections to provide the outer walls of the said nuts, depositing a disc into the opening provided by the upwardly bent portions of metal, and thereafter bending the outer part of the said upwardly bent portion inwardly onto the top side of the outer portion of the said disc.

5. The process of producing nuts which comprises the subjection of portions of a sheet metal strip located at intervals in the said strip to successive pressure actions to form projections by such pressure actions, causing portions of the metal of said sheet metal strip surrounding the said projections to flow into the side walls of said projections to thicken the same, the portions of metal surrounding said projections being simultaneously reduced in thickness, forming openings successively in the bottoms of the said projections, thereafter converting the said projections into tubular form, successively upsetting the outer ends of the said tubular projections, thereafter tapping the said tubular projections, cutting blanks from the said strip each blank including a tapped tubular projection and also including the surrounding relatively thin portion of metal and around the relatively thin portion a portion of the normal thickness of the strip, thereafter bending the portion of the metal of each blank surrounding the projection thereof upwardly in spaced approximately concentric relation to the said tubular projection, the relatively thin portion of the bent-up metal extending above the top of the said tubular projection, placing an annular disc in the open end of the said bent-up portion, and thereafter bending over upon the top side of the outer edge portion of the said disc the outer edge part of the said upwardly bent portion.

6. The process of making a nut from a sheet of metal, which comprises the formation of a tubular projection upon one side of said sheet, increasing the thickness of the wall of said tubular projection, tapping said tubular projection, cutting from said sheet a blank having said tubular projection arranged substantially centrally thereof, bending the portion of said blank surrounding said tubular projection to form a wall around said tubular projection and extending beyond the free end thereof, and bending the free edge of said wall into overlying relation with respect to the free end of said tubular projection.

7. The method of making a nut which comprises the formation of a tapped tubular projection upon one side of a sheet metal blank, forming spaced projections on the edge of the blank, bending the marginal portion of the resulting blank to form a wall surrounding said tubular projection and extending beyond the free end thereof, placing a washer upon the free end of said tubular projection, and bending said spaced projections inwardly into engagement with said washer to retain the same in position on said tubular projection.

8. The method of making a nut which comprises the formation of a tubular projection centrally of a sheet metal blank, forming a notched edge on said blank, bending the marginal portion of the resulting blank to form a wall surrounding said tubular projection and extending beyond the free end thereof, placing a washer upon the free end of said tubular projection, and bending the projecting portions of said notched edge inwardly upon said washer with adjacent edges in contact with each other to retain the washer in position.

9. The method of making a nut which comprises the provision of a nut blank having a hollow projection upon one side thereof and a portion of decreased thickness immediately surrounding said projection, bending the marginal portion of said blank to form a wall surrounding said projection and extending beyond the free end thereof, and bending the free edge of said wall inwardly into overlying relation with respect to the free end of said projection.

CARL ARTHUR SWANSTROM.